Feb. 4, 1964   F. W. STREETER ETAL   3,120,028
FLEXIBLE CORE ASSEMBLY

Filed May 15, 1962   6 Sheets-Sheet 1

FORREST W. STREETER, INVENTORS
RALPH W. SNOWDEN
CHARLES R. BAKER
BY

ATTORNEY

FORREST W. STREETER, INVENTORS
RALPH W. SNOWDEN
CHARLES R. BAKER
BY

ATTORNEY

Feb. 4, 1964     F. W. STREETER ETAL     3,120,028
FLEXIBLE CORE ASSEMBLY
Filed May 15, 1962     6 Sheets-Sheet 6
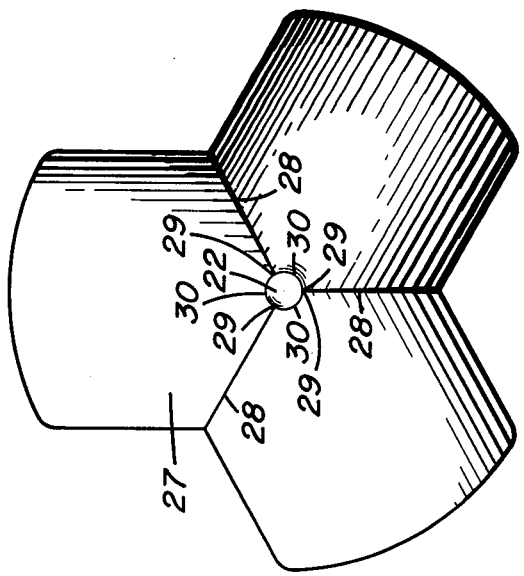
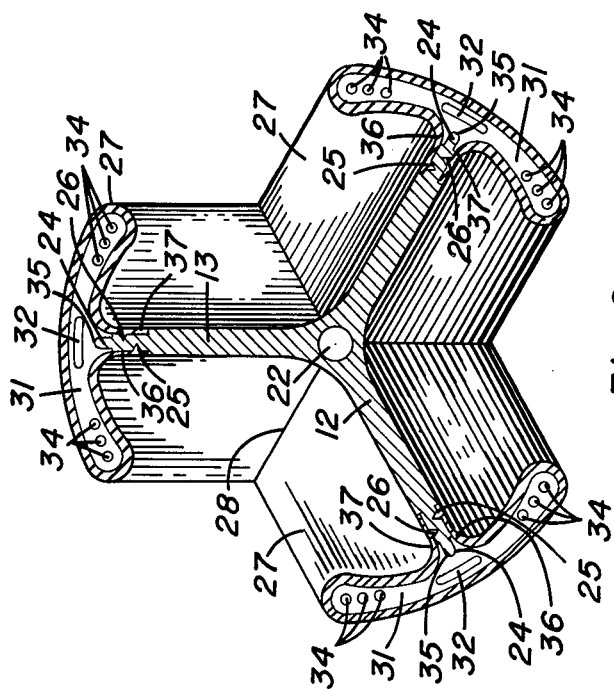
FORREST W. STREETER, INVENTORS
RALPH W. SNOWDEN
CHARLES R. BAKER
BY
ATTORNEY 3,120,028
FLEXIBLE CORE ASSEMBLY
Forrest W. Streeter, Madison, and Ralph W. Snowden and Charles R. Baker, Huntsville, Ala., assignors to Thiokol Chemical Corporation, Bristol, Pa., a corporation of Delaware
Filed May 15, 1962, Ser. No. 194,947
9 Claims. (Cl. 18—45)

This invention relates to a flexible core assembly for use in forming partially arcuate cavities in solid propellant for solid propellant rocket motors.

A conventional solid propellant rocket motor casing comprises an elongated cylindrical body having an open end and an ellipsoidal closed end. To accomplish high volumetric loading density and low temperature characteristics, the web of the core used to provide the central cavity in the solid propellant adapted to be cast and cured in the motor casing should follow the contour of the ellipsoidal closed end thereof as uniformly as possible.

A straight-through core is not satisfactory since it will displace too large an amount of the solid propellant in the ellipsoidal closed end of the motor casing. It is also obvious that one-piece core having the proper configuration could not be pulled or extracted from the solid propellant after it has been cast and cured since the arcuate ends of the core conforming to the curvature of the ellipsoidal closed end of the motor casing would be larger than the cavity formed by the straight surfaces of the core in the solid propellant.

It is an object of this invention, therefore, to provide a flexible core assembly having a central rigid core section with the major surfaces thereof essentially parallel to the axis of the withdrawal thereof and a plurality of resilient bulb or tear-drop shaped segments, defining the arcuate portions of the desired cavity, detachably mounted on the inner end of the rigid core section. In this type of construction, the bulb or tear-drop shaped segments must follow the web of the core around to the inner tip thereof that is positioned in the ellipsoidal shaped head end of the motor casing.

The bulb or tear-drop shaped segments are made of a suitable rubber or other elastomeric material that can be molded in the desired arcuate configuration over a plurality of suitably shaped reinforcing members to which are rigidly connected suitable pulling cables for removing the bulb or tear-drop shaped segments from the motor casing without disturbing the contour of the cavity formed in the solid propellant configuration. The flexible bulb or tear-drop shaped segments are slip fit onto the rigid core section and are properly aligned therewith by means of the engagement of the alignment lips that are molded into the bulb or tear-drop shaped segments with the alignment grooves that are formed in the alignment extensions on the rigid core section. The rigid core section being provided with appropriate passages through which the pulling cables extend outwardly of the outer end thereof.

In use, the mating ends of the bulb and tear-drop shaped segments and the ends of the rigid core which they contact have an adhesive applied thereto and the ends are then bonded together. The bulb or tear-drop shaped segments will, however, separate from the rigid core section under a slight tension that will be applied when the rigid core section is removed from the motor casing. After the solid propellant has been cured and the rigid core section has been removed, the bulb or tear-drop shaped segments will remain in place in the motor casing. When tension is applied to the pulling cables, the bulb or tear-drop shaped segments that are endowed with sufficient flexibility to be reduced in cross-sectional area to permit them to follow the contour of the cavity formed in the solid propellant are pulled from the motor casing by the pulling cables.

Further objects of the present invention include:

Rapid and easy removal of the flexible core assembly after the solid propellant has been cured;
No contamination with fusible alloy mandrels or cores;
No joint lines;
Reuseable bulb or tear-drop shaped segments that are readily reattached to a rigid core section;
Smooth surfaces in the cavity formed in the solid propellant configuration without permanent bonding to the rigid core section by selection of the proper molding material for the bulb or tear-drop shaped segments; and
The ability to form multiple connected (or non-connected) cavities in the solid propellant of many and varied configurations.

With the above and other objects and advantages in view, the invention consists of the minor details of construction and arrangement of parts more fully hereinafter described, claimed and illustrated in the accompanying drawings in which:

FIGURE 6 is a transverse sectional view taken through the rigid core section and the bulb or tear-drop shaped segments of the flexible core assembly, and FIGURE 7 is an elevational end view of the bulb or tear-drop shaped segments of the flexible core assembly.

Figure 1:
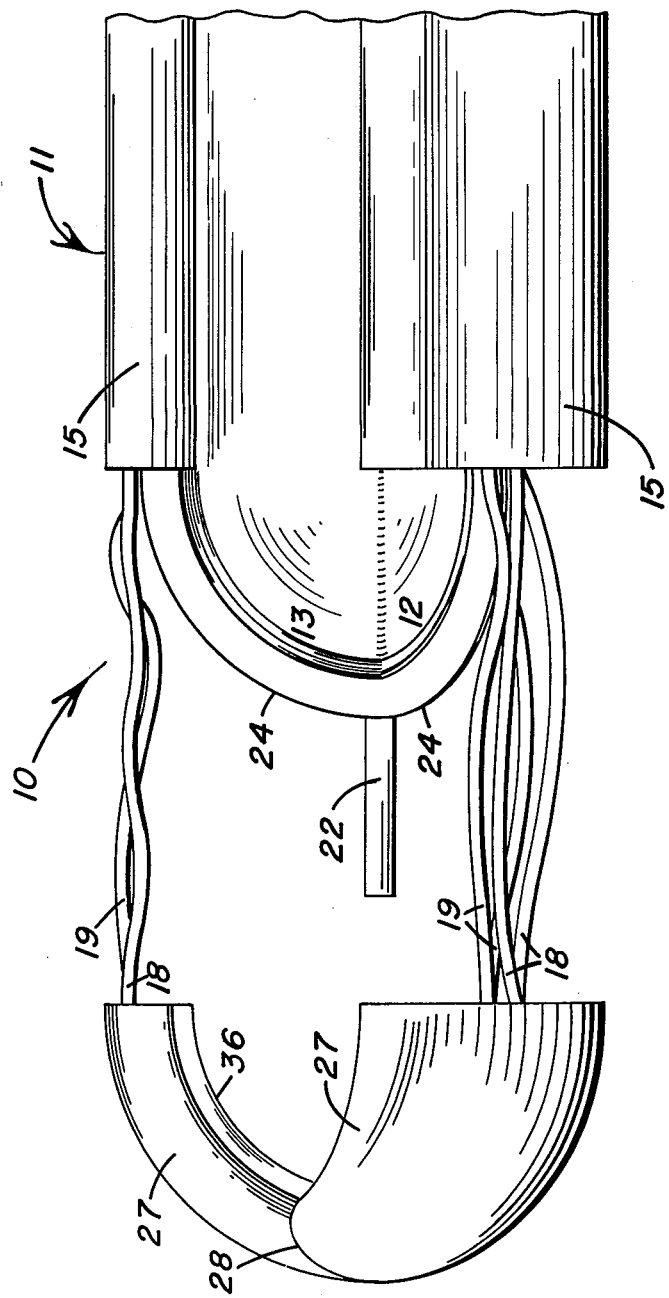
FIGURE 1 is an elevational view of a flexible core assembly embodying the invention.

Referring more in detail to the drawings wherein like parts are designated by like reference numerals, the reference numeral 10 is used to designate a flexible core assembly embodying the invention.

The flexible core assembly 10, as illustrated, is shown to comprise a rigid core section 11, which includes a plurality of integrally related radially disposed webs 12, 13, and 14 respectively. Rigid with the outer edge of each of the webs 12, 13, and 14 is an arcuate shaped wing member 15 and each of the members 15 lie in a plane that extends at a substantial right angle to the respective webs 12, 13, and 14 from the point of integration thereof. Each of the members 15 is provided at the center thereof with a pair of spaced parallel longitudinally extending passages 16 and 17 through which extend at the outer end thereof pulling cables 18 and 19 respectively. The inner edges of the webs 12, 13, and 14 are of a shape to conform to the ellipsoidal end 20 of a motor casing 21 and at the central axis of the webs 12, 13, and 14, a centering or guide pin 22 extends outwardly of the inner end of the rigid core section 11. A reinforced opening 23 in the center of the ellipsoidal shaped end 20 of the motor casing 21 permits egress of the pin 22 outwardly of the motor casing 21 when the flexible core assembly 10 is inserted into the motor casing 20 as in FIGURE 2.

Each of the webs 12, 13, and 14 at the inner peripheral edge thereof is provided with an alignment extension 24 and a pair of spaced alignment grooves 25 and 26 are provided in the opposite faces of the webs 12, 13, and 14 adjacent the peripheral edge of each of the alignment extensions 24.

Slidably mounted on each peripheral edge of the extensions 24 is a bulb or tear-drop shaped segment 27. Each of the segments 27 is molded from a suitable flexible material to conform transversely thereof to the cross-sectional area of the webs 12, 13, and 14 and longitudinally thereof to the shape of the extensions 24. One end of each of the segments 27 is of a shape to conform to the inner end of the member 14 and the opposite end of each of the segments 27 is shaped to provide a sector 28 that is approximately one-third of a circle so that when the apex 29 of each of the sectors 28 are inter-mated, the segments 27 will be a continuation of the members 15 and conform to the curvature of the ellipsoidal closed end 20 of the motor casing 21. Each of the apexes 29 is provided with an arcuate shaped cutout 30 so that the guide pin 22 will pass through a central opening formed by the cutouts 30 as shown in FIGURE 7.

Embedded in the moldable material from which the bulb or tear-drop shaped segments are formed, are a plurality of reinforcing members 31. The members 31 are equally spaced from each other, conform substantially in shape to the members 15 and have centrally located elongated slots 32 therein through which the pulling cables 18 and 19 extend. Lock washers or similar fastening means 33 are positioned on the pull cables 18 and 19 on opposite sides of the members 31 to retain the members 31 in fixed spaced relation to each other and to prevent the pulling cables 18 and 19 from becoming disengaged from the members 31. Spaced parallel openings or vents 34 are provided in the members 31 adjacent each end thereof to allow the moldable material to pass therethrough and more firmly bond the members 31 thereto.

The center of each of the members 31 is provided with a groove 35 to receive the outer edge of the extension 24 on which it is mounted and each of the bulb or tear-drop shaped segments 27 have diametrically opposed longitudinally extending parallel alignment lips 36 and 37 respectively that engage the opposite sides of the extensions 24. Each of the lips 36 and 37 during the molding of a bulb or tear-drop shaped segment 27 has a tit formed thereon which enters into the grooves 25 and 26 to retain the bulb or tear drop shaped segments 27 in position until the rigid core section 11 is forceably detached therefrom.

The flexible core assembly 10 solves the problem of pulling the core section 11 from the motor casing 21 without disfiguring or damaging the configuration of the solid propellant 38 that has been cast and cured in the motor casing 21.

Figure 2:
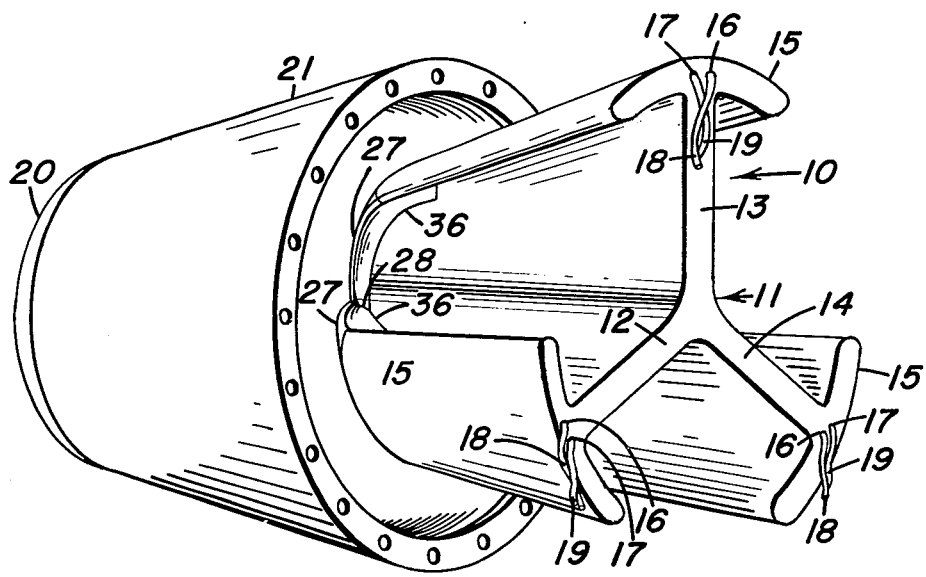
FIGURE 2 is a perspective view showing the manner of insertion of the flexible core assembly into a motor casing.
Figure 3:
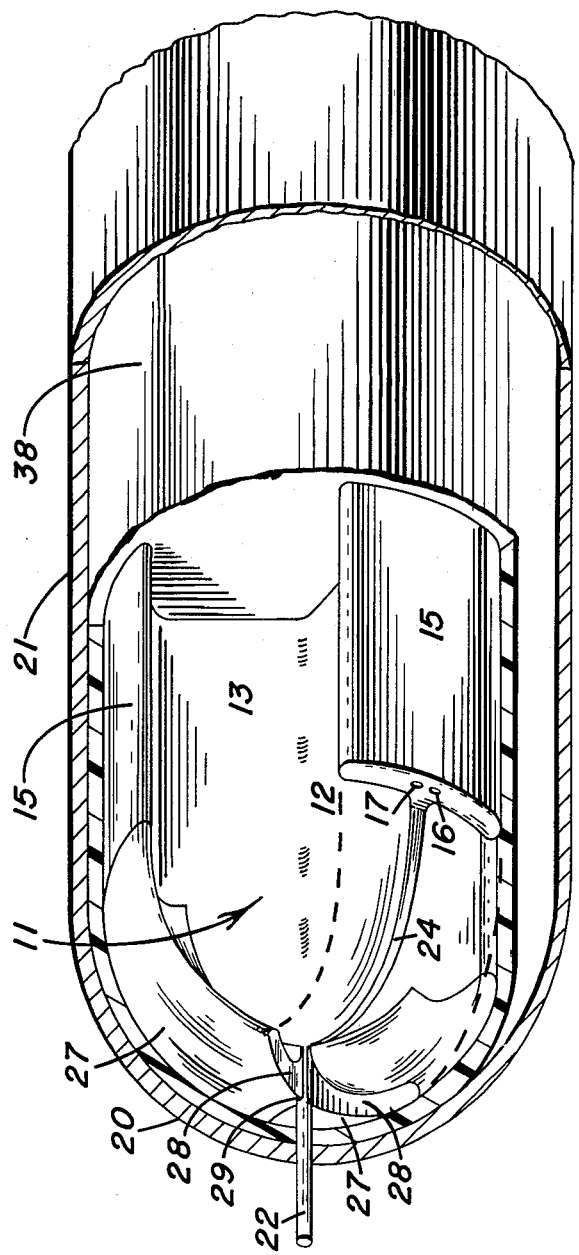
FIGURE 3 is an elevational view partly broken away and partly in section to show more clearly the relation of the flexible core assembly in regard to the solid propellant and the motor casing.

To carry out the principles of the invention, the assembled flexible core assembly 10 is inserted into the motor-casing 21 as shown in FIGURE 2. As shown in FIGURE 3, the solid propellant 38 is cast into the motor casing 21 and fills the motor casing 21 except for that portion thereof occupied by the flexible core assembly 10.

Figure 4:
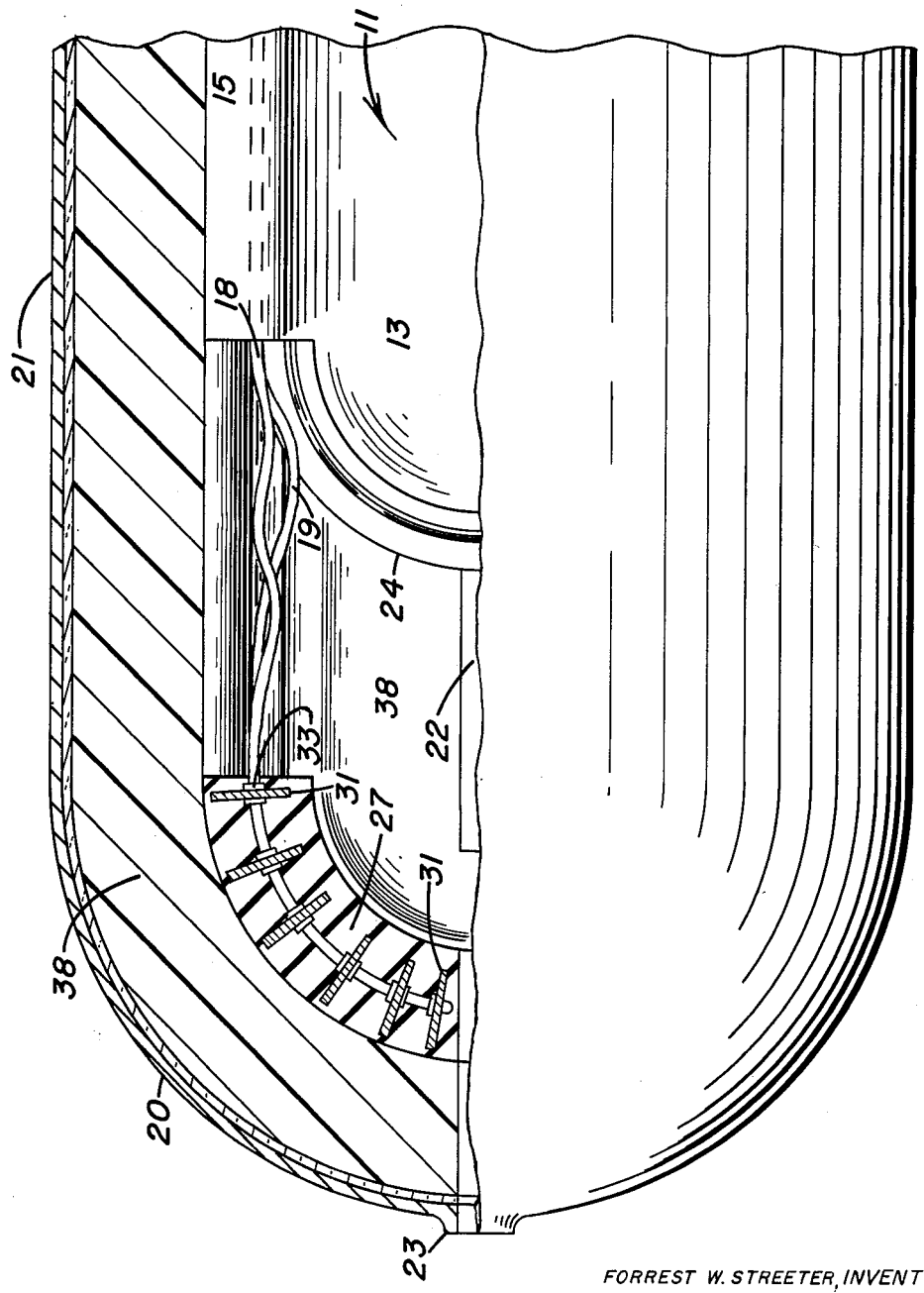
FIGURE 4 is an elevational view partly broken away and partly in section showing the manner of removing the rigid core section of the flexible core assembly from the motor casing.
Figure 5:
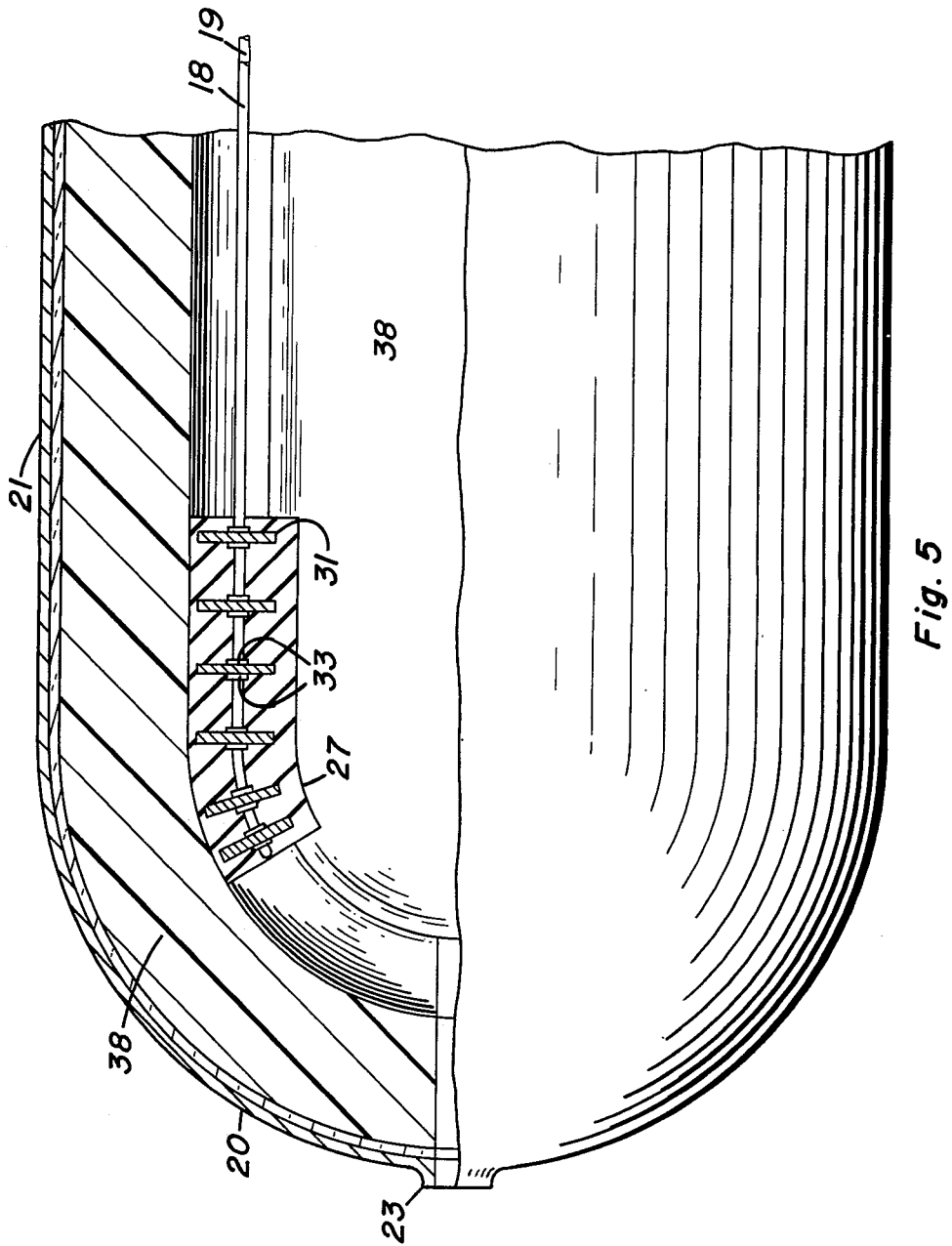
FIGURE 5 is a view similar to FIGURE 4 showing the manner of removing the bulb or tear-drop shaped segments of the flexible core assembly from the motor casing.

After the solid propellant 38 has been cured, the rigid core section 11 is removed as shown in FIGURE 4 leaving the bulb or tear-drop shaped segments in place in the motor casing 21. The pulling cables 18 and 19 are then placed under tension and the bulb or tear-drop shaped segments 27 are pulled from the motor casing 21 as shown in FIGURE 5.

The flexibility of the bulb or tear-drop shaped segments 27 will permit the same to be removed from the motor casing 21, leaving a smooth surface in the solid propellant 38 that defines the cavity formed by the flexible core assembly 10 and the removal of the rigid core section 11 and the bulb or tear-drop shaped segments 27 leave a well-defined cavity in the solid propellant that provides the most efficient operation of the solid propellant rocket motor.

One of the main safety factors of the invention is the elimination of possible ignition of the solid propellant that could be caused by friction created by the removal of the bulb or tear-drop shaped segments 27.

It is believed that, from the foregoing description, the structure and manner of use of the flexible core assembly will be apparent to those skilled in the art; and it is to be understood that changes in the minor details of construction, arrangement, and combination of parts may be resorted to provided they fall within the spirit of the invention and the scope of the appended claims.

Having thus described the invention, what is claimed as new and desired to be secured by Letters Patent is:

1. A flexible core assembly for use in forming a cavity in a solid propellant comprising a rigid core section having radially disposed webs, wing members at the outer ends of said webs being curved to conform to the configuration of the ellipsoidal end of a rocket motor casing, extensions on the inner edges of said webs and removable flexible segments mounted on said extensions and conforming to the shape thereof.

2. A flexible core assembly, as in claim 1, wherein said wing members are provided with a pair of longitudinally extending passages and pulling cables are extended through said passages and connected to said segments.

3. A flexible core assembly, as in claim 1, wherein said segments are formed from an elastomeric material having a plurality of reinforcing members embedded therein.

4. A flexible core assembly, as in claim 3, wherein each of said reinforcing members is provided with a centrally located slot, pulling cables are extended through said slots and means are provided on the opposite sides of said members adjacent said slots for rigidly securing said members to said pulling cables.

5. A flexible core assembly, as in claim 1, wherein said wing members at the center thereof are disposed in a plane extending at a right angle to the axis of said webs.

6. A flexible core assembly, as in claim 1, wherein each of said extensions has an alignment groove in the opposite faces thereof.

7. A flexible core assembly, as in claim 4, wherein each of said flexible segments have diametrically-opposed longitudinally extending parallel alignment lips thereon that engage the opposite sides of said extensions, and each of said lips has a tit formed thereon which enters the alignment groove in that face of the extension with which it coacts.

8. A flexible core assembly, as in claim 1, wherein a centering pin extends outwardly of the inner end of said rigid core section.

9. A flexible core assembly, as in claim 3, wherein each of said reinforcing members is provided with a groove to receive the extension on the inner edge of the web with which it coacts, and each of said segments have diametrically opposed longitudinally extending parallel alignment lips that engage the opposite sides of said extensions.

References Cited in the file of this patent

UNITED STATES PATENTS

| | | |
|---|---|---|
| 333,755 | Isaacs | Jan. 5, 1886 |
| 1,556,869 | Murray | Oct. 13, 1925 |
| 1,563,529 | Satterlee | Dec. 1, 1925 |
| 2,152,738 | Jeffery | Apr. 4, 1939 |
| 2,847,708 | Hamjian et al. | Aug. 19, 1958 |
| 2,890,490 | Morin | June 16, 1959 |
| 3,057,014 | Kirch | Oct. 9, 1962 |

FOREIGN PATENTS

| | | |
|---|---|---|
| 229,762 | Great Britain | Mar. 2, 1925 |
| 84,789 | Denmark | Dec. 30, 1957 |